(12) United States Patent
Edwards et al.

(10) Patent No.: US 12,363,111 B2
(45) Date of Patent: Jul. 15, 2025

(54) UNAUTHORIZED DEVICE DETECTION IN A COMPUTING ENVIRONMENT

(71) Applicant: HEWLETT PACKARD ENTERPRISE DEVELOPMENT LP, Houston, TX (US)

(72) Inventors: Nigel John Edwards, Bristol (GB); Thomas M. Laffey, Roseville, CA (US); Ludovic Emmanuel Paul Noel Jacquin, Bristol (GB); Sunil James, San Jose, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 240 days.

(21) Appl. No.: 18/047,785

(22) Filed: Oct. 19, 2022

(65) Prior Publication Data
US 2024/0137363 A1 Apr. 25, 2024
US 2024/0236089 A9 Jul. 11, 2024

(51) Int. Cl.
*H04L 29/06* (2006.01)
*H04L 9/40* (2022.01)

(52) U.S. Cl.
CPC ...... *H04L 63/0876* (2013.01); *H04L 63/0209* (2013.01)

(58) Field of Classification Search
CPC .......... H04L 63/0876; H04L 63/0209; H04W 12/71; H04W 12/73; H04W 12/77; G06F 21/57
See application file for complete search history.

(56) References Cited

U.S. PATENT DOCUMENTS 7,194,004 B1 * 3/2007 Thomsen .............. H04L 63/101 726/17
9,411,962 B2 8/2016 Attfield et al.
(Continued)

OTHER PUBLICATIONS

Microsoft Learn, "Trusted Platform Module attestation", 2022, 5 pages.
(Continued)

*Primary Examiner* — Joseph P Hirl
*Assistant Examiner* — Chi D Nguy
(74) *Attorney, Agent, or Firm* — Trop, Pruner & Hu, P.C.

(57) ABSTRACT

In some examples, a system receives information from electronic devices comprising network devices and computing devices in a computing environment that are subject to attestations of interfaces of the network devices and the computing devices. For each interface of a given computing device being attested, the system verifies that the interface of the given computing device is connected to an interface of a corresponding network device that is being attested. For each interface of a given network device being attested, the system verifies that the interface of the given network device is connected to an interface of a corresponding computing device that is being attested or an interface of another network device that is being attested. The system detects a presence of an unauthorized electronic device in the computing environment in response to determining that an interface of a computing device being attested or an interface of a network device being attested is not connected to a corresponding interface of an electronic device being attested.

20 Claims, 5 Drawing Sheets

(56) References Cited

U.S. PATENT DOCUMENTS

| | | | |
|---|---|---|---|
| 9,973,515 B1* | 5/2018 | Corbett | H04L 63/0236 |
| 10,122,695 B2 | 11/2018 | Zhang et al. | |
| 10,425,282 B2 | 9/2019 | Jacquin et al. | |
| 10,579,800 B2 | 3/2020 | Blundell | |
| 10,680,812 B2 | 6/2020 | Hayton et al. | |
| 10,841,307 B2 | 11/2020 | Smith et al. | |
| 11,290,471 B2 | 3/2022 | Wang et al. | |
| 2007/0185856 A1 | 8/2007 | Mittal et al. | |
| 2019/0036951 A1* | 1/2019 | Kim | H04L 63/1425 |
| 2020/0127850 A1 | 4/2020 | Scarlata et al. | |
| 2020/0367054 A1 | 11/2020 | Obaidi | |
| 2021/0065267 A1 | 3/2021 | Smith et al. | |
| 2023/0118730 A1* | 4/2023 | Dossary | H04L 63/0254 726/11 |

OTHER PUBLICATIONS

Solarwinds, "Detecting and Preventing Rogue Devices", 2022, 10 pages.
Solarwinds, "User Device Tracker Automated Device Tracking and Switch Port Management", Datasheet, 2020, 4 pages.
Wikipedia, "Multiprotocol Label Switching", available online at <https://en.wikipedia.org/w/index.php?title=Multiprotocol_Label_Switching&oldid=1110333097>, Sep. 14, 2022, 7 pages.

* cited by examiner

UNAUTHORIZED DEVICE DETECTION IN A COMPUTING ENVIRONMENT

BACKGROUND

A computing environment can include electronic devices, such as computing devices and network devices that allow the computing devices to communicate with one another or with other endpoints. Examples of network devices include switches, routers, or any other type of a communication device that propagates data from a source to a destination.

BRIEF DESCRIPTION OF THE DRAWINGS

Some implementations of the present disclosure are described with respect to the following figures.

Figure 1:
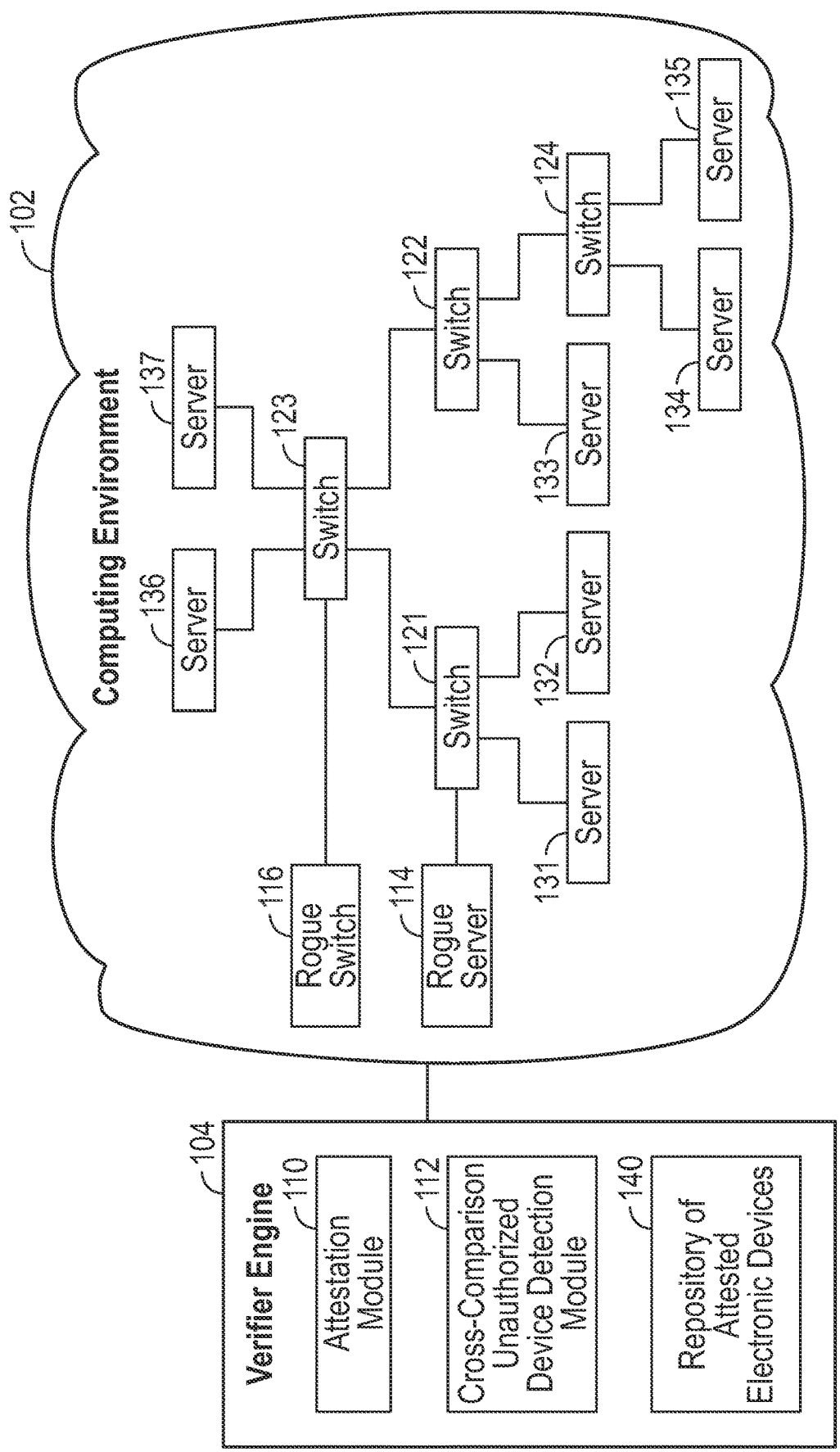
FIG. 1 is a block diagram of an arrangement that includes a computing environment with computing devices and network devices, and an integrity engine, according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In some examples, a computing environment can include an entity to perform attestations of electronic devices including computing devices and network devices. "Attestation" can generally refer to a process by which one electronic device, called a "verifier," challenges a target electronic device to check whether the target electronic device is trustworthy. In a computing environment with computing devices and network devices, a verifier can receive measurements of information associated with the computing devices and the network devices, and the verifier can determine the trustworthiness of the computing devices and the network devices based on the measurements.

In some examples, a measurement received by the verifier is of a device state of an electronic device (a computing device or a network device). A "device state" of an electronic device includes information associated with an ability of the electronic device to communicate with another electronic device. The device state of the electronic device can include information associated with the configuration of each interface of the electronic device. An "interface," can refer to a component of the electronic device that is used by the electronic device to communicate with an entity outside of the electronic device. For example, an interface of a network device can include a physical port of the network device, such as a port of a switch or router. A network device may include multiple ports. An interface of a computing device can include a network interface controller (NIC) of the computing device. A computing device may include one NIC or multiple NICs. An interface of the computing device can also be referred to as a port of the computing device.

Each electronic device to be attested (also referred to as an "attester device") includes a root of trust (RoT), such as in the form of a Trusted Platform Module (TPM) or another security processor that can protect measurements of device states of the electronic device. The measurements are produced by a Core Root of Trust for Measurement (CRTM), which is also a RoT, for components of the electronic device as the components initialize and execute. The measurements can be stored by the TPM to protect the measurements from tampering.

To perform an attestation of the electronic device, a verifier may send a challenge (which may include a nonce (a random number) and other information) to the electronic device. The RoT of the electronic device can use a private key of a public-private key pair to generate a digital signature based on the nonce (and possibly other information in the challenge) and the device state of the electronic device. The electronic device sends the digital signature as part of a measurement to the verifier to allow the verifier to determine the trustworthiness of the electronic device. If the verifier is able to confirm that the digital signature is valid, such as by using a public key of the public-private key pair, and the measurement indicates an expected state, then the verifier can indicate that a successful attestation has been performed.

A large computing environment can include many electronic devices (tens or hundreds or thousands of electronic devices, for example). In some cases, the electronic devices may be mounted in multiple racks that are interconnected with one another. A "rack" can refer to any enclosure in which multiple electronic devices can be received. Although reference is made to racks in some examples, in other examples, electronic devices can be arranged within a computing environment in a different manner.

A malicious user can attempt to attack a computing environment by physically connecting a rogue electronic device in the computing environment. A "rogue" electronic device can refer to any electronic device that should not be allowed in the computing environment. A "rogue" electronic device can also be referred to as an "unauthorized" electronic device, since the electronic device is not authorized to be used in the computing environment.

In an example, a rogue electronic device can include a rogue computing device. The rogue computing device can be a passive or active. A passive rogue computing device can passively monitor traffic communicated over a network to which the passive rogue device is coupled. The passive rogue computing device does not transmit data in the network. By monitoring traffic communicated in the network, the passive rogue computing device can acquire and store information of the computing environment. Even if most of the traffic communicated over the network is encrypted, the passive rogue computing device can nevertheless still be able to obtain useful (unencrypted) information about the computing environment. Alternatively or additionally, the encrypted network traffic can be stored in the passive rogue computing device, which can be removed from the computing environment at a later time. A malicious user may attempt to decrypt the encrypted network traffic so as to obtain information of the computing environment.

An active rogue computing device can inject malicious traffic into a network, to cause the malicious traffic to be propagated across the computing environment. For example, the active rogue computing device can perform a port scan by which the active rogue computing device can detect weak points in the network. A "weak point" can refer to any point in the network (such as a port of a network device) that is not adequately protected by a security mechanism such that an unauthorized entity can gain access to the computing environment through the weak point. The weak point on the network can be used to perform an attack on the computing environment. An injection of malicious traffic can also be used to perform reconnaissance to identify vulnerable services executing in the computing environment. An unauthorized entity can gain access of or take over a vulnerable service to perform malicious actions in the computing environment.

In other examples, a rogue electronic device can be a rogue network device (e.g., a rogue switch, a rogue router, etc.). The rogue network device can also be used to gain information of the computing environment as part of that an attack.

If a rogue electronic device is not detected in a timely fashion, sensitive information may be obtained by a malicious actor, and/or the malicious actor can cause damage to the computing environment by attacking weak points or services of the computing environment.

In accordance with some implementations of the present disclosure, detection of unauthorized electronic devices in a computing environment can be performed by use of cross comparison of information of interfaces of network devices and computing devices that are being attested. For each interface of a given computing device being attested, techniques according to some implementations can verify that the interface of the given computing device is connected to an interface of a corresponding network device that is being attested, and for each interface of a given network device being attested, techniques according to some implementations can verify that the interface of the given network device is connected to an interface of a corresponding computing device that is being attested or an interface of another network device that is being attested. Techniques according to some implementations can detect a presence of an unauthorized electronic device in the computing environment in response to determining that an interface of a computing device being attested or an interface of a network device being attested is not connected to a corresponding interface of an electronic device being attested.

Examples of computing devices that can be provided in a computing environment include any or some combination of the following: server computers (or more simply, "servers"), desktop computers, notebook computers, storage systems, virtual machines, or other electronic devices that are able to execute operations to perform requested tasks. Computing devices (which may be physical or virtual) may communicate with one another using network devices in the computing environment.

A "network device" can refer to any type of communication device that propagates information sent from a source to a destination (or multiple destinations). A network device may be a physical network device or a virtual network device. For example, a given network device can propagate data from a source computing device along a network path toward a destination computing device. The network device can propagate the data either directly to the destination computing device if the destination computing device is connected to the given network device, or the given network device can propagate the data to another network device if the destination computing device is connected further downstream of the given network device.

Examples of network devices include switches, routers, or other types of communication devices. A switch can propagate a data unit (e.g., a data frame, a data packet, etc.) based on network addresses included in the data unit. In examples where switches are included in circuit-based networks, data can be propagated using path identifiers, such as labels according to the Multiprotocol Label Switching (MPLS) technology.

Network addresses can include a source network address (that identifies a source of the data unit) and a destination network address (that identifies a destination of the data unit). The network addresses included in the data unit to be forwarded by the switch can include layer 2 network addresses, such as Medium Access Control (MAC) addresses. In an example, the switch can store forwarding information (e.g., a forwarding table) that can be used by the switch to forward a data unit received at a first port of the switch to another selected port of the switch, based on source and destination MAC addresses included in the data unit.

A router can similarly route a data unit from a source to a destination, also based on network addresses. In the case of a router, the network addresses used to route a data unit can include layer 3 network addresses, such as an Internet Protocol (IP) addresses. The router can store routing information (e.g., a routing table) that can be used by the router to route a data unit based on source and destination IP addresses in the data unit.

FIG. 1 is a block diagram of an example arrangement that includes a computing environment 102 and a verifier engine 104 that is used to perform attestations of electronic devices in the computing environment 102, and to detect presence of any unauthorized electronic devices in the computing environment 102.

The computing environment 102 includes various switches 121, 122, 123, 124, and servers 131 to 137 that are connected to respective switches. Each switch can be a physical switch or virtual switch, while each server can be a physical server or a virtual server. In the example of FIG. 1, the switches are examples of network devices, and the servers are examples of computing devices. In other examples, the computing environment 102 can include other types of computing devices and/or other types of network devices.

In an example, data sent by the server 131 to the server 132 would traverse through just the switch 121. In another example, data sent by the server 131 to the server 135 would traverse through the switches 121, 123, 122, and 124. When a switch receives a data unit from a source server, the switch determines a network path over which the data unit is to be forwarded based on source and destination network addresses in the data unit. The switch uses a forwarding table to determine which port of the switch the data unit is to be forwarded to, based on the source and destination network addresses in the data unit.

The verifier engine 104 includes an attestation module 110 and a cross-comparison unauthorized device detection module 112. As used here, an "engine" can refer to one or more hardware processing circuits, which can include any or some combination of a microprocessor, a core of a multi-core microprocessor, a microcontroller, a programmable integrated circuit, a programmable gate array, or another hardware processing circuit. Alternatively, an "engine" can refer to a combination of one or more hardware processing circuits and machine-readable instructions (software and/or firmware) executable on the one or more hardware processing circuits.

Each of the modules 110 and 112 can include a part of the hardware processing circuit of the verifier engine 104, or can be implemented using machine-readable instructions executable by the verifier engine 104.

The attestation module 110 performs attestations of electronic devices in the computing environment 102, including the switches 121 to 124 and the servers 131 to 137. To perform an attestation of an electronic device in the computing environment 102, the attestation module 110 can send a challenge to the electronic device, which can respond with a measurement that is used by the attestation module 110 to verify the trustworthiness of the electronic device.

Attesting an individual electronic device does not confirm that another electronic device connected to the individual electronic device is an expected electronic device or even is supposed to be connected to the individual electronic device. Attesting the individual electronic device also does not confirm that the other connected electronic device matches a network access that the other electronic device is expected to have.

The cross-comparison unauthorized device detection module 112 is able to apply cross comparison of information of interfaces of the switches and the servers to detect presence of a rogue electronic device, such as a rogue server 114 or a rogue switch 116 in the computing environment 102. The rogue server 114 is connected to a port of the switch 121, and the rogue switch 116 is connected to a port of the switch 123. Although not shown, authorized server(s) and/or rogue server(s) can also be connected to port(s) of the rogue switch 116.

The attestation module 110 can perform an attestation of each port of a switch by verifying various device states of the port, including any or some combination of the following: an enabled or disabled state of each port of a switch; forwarding information (e.g., a forwarding table) used by the switch; a configuration state indicating whether port-mirroring is enabled for each enabled port of the switch (where port-mirroring refers to duplicating traffic received at or sent by a first port to a second port of the switch); network address information for each enabled port of the switch; advertisement information sent from each port of the switch; and so forth. A RoT (e.g., a CRTM) in the switch can perform a measurement of the device state information for each port of the switch, and a TPM can store and provide the measurement to the attestation module 110. Attestation of the port of the switch may fail if any of the foregoing example device states for the port deviates from an expected device state. Although various example device states are listed above, in other examples, a different collection of device states of each port of a switch may be attested by the attestation module 110.

Examples of network address information can include any or some combination of the following: a MAC address of a server connected to a port of the switch, and/or an IP address of a server connected to the port of the switch. Advertisement information can include information included in advertisement messages, such as Link Layer Discovery Protocol (LLDP) messages, or messages according to other protocols. An advertisement message can be used to provide information regarding an electronic device, such as a switch. For example, an advertisement message can indicate that an electronic device is a switch or a server.

The attestation module 110 can perform an attestation of the following device state of each interface of a server, including any or some combination of the following: network address information for each interface of the server, such as a MAC address and/or IP address of the NIC; network address information, such as a MAC address and/or IP address, of each NIC of a baseboard management controller (BMC) in the server; a Local Device Identity (LDevID) of the server; and so forth. A BMC is discussed further below. An LDevID can be issued to the server when the server is admitted to a network. The LDevID can be according to the Institute of Electrical and Electronics Engineers (IEEE) 802.1AR standard, for example, and is a certificate used for proving to other parties that the identified server is authorized to be on a network. Although reference is made to LDevIDs in some examples, in other examples, servers can be identified using other identifiers.

A RoT in the server can perform a measurement of the device state information, and provide the measurement to the attestation module 110. Attestation of the server may fail if any of the foregoing example device states deviates from an expected device state. Although various example device states are listed above, in other examples, a different collection of device states of each interface of a server may be attested by the attestation module 110.

In further examples, an interface (e.g., NIC) of a server supports a security protocol when communicating with the verifier engine 104 over a communication link. An example of a security protocol is according to the Security Protocol and Data Model (SPDM) Specification, which enables a secure transport of information pertaining to the interface of the server. In such examples, device state information (such as network address information) of the interface of the server can be authenticated according to SPDM, before the authenticated device state information is passed to the attestation module 110 for attestation.

In other examples, a BMC can perform authentication of device state information of the interface of the server. The BMC can pass an indication of the authentication performed by the BMC to the attestation module 110, which can perform the attestation of the interface of the server further based on the indication of the authentication performed by the BMC.

Note that the authentication of device state information according to SPDM and/or by the BMC can be in addition to the measurement of the device state information provided by a RoT of the server, such as a TPM or another security processor.

Figure 2:
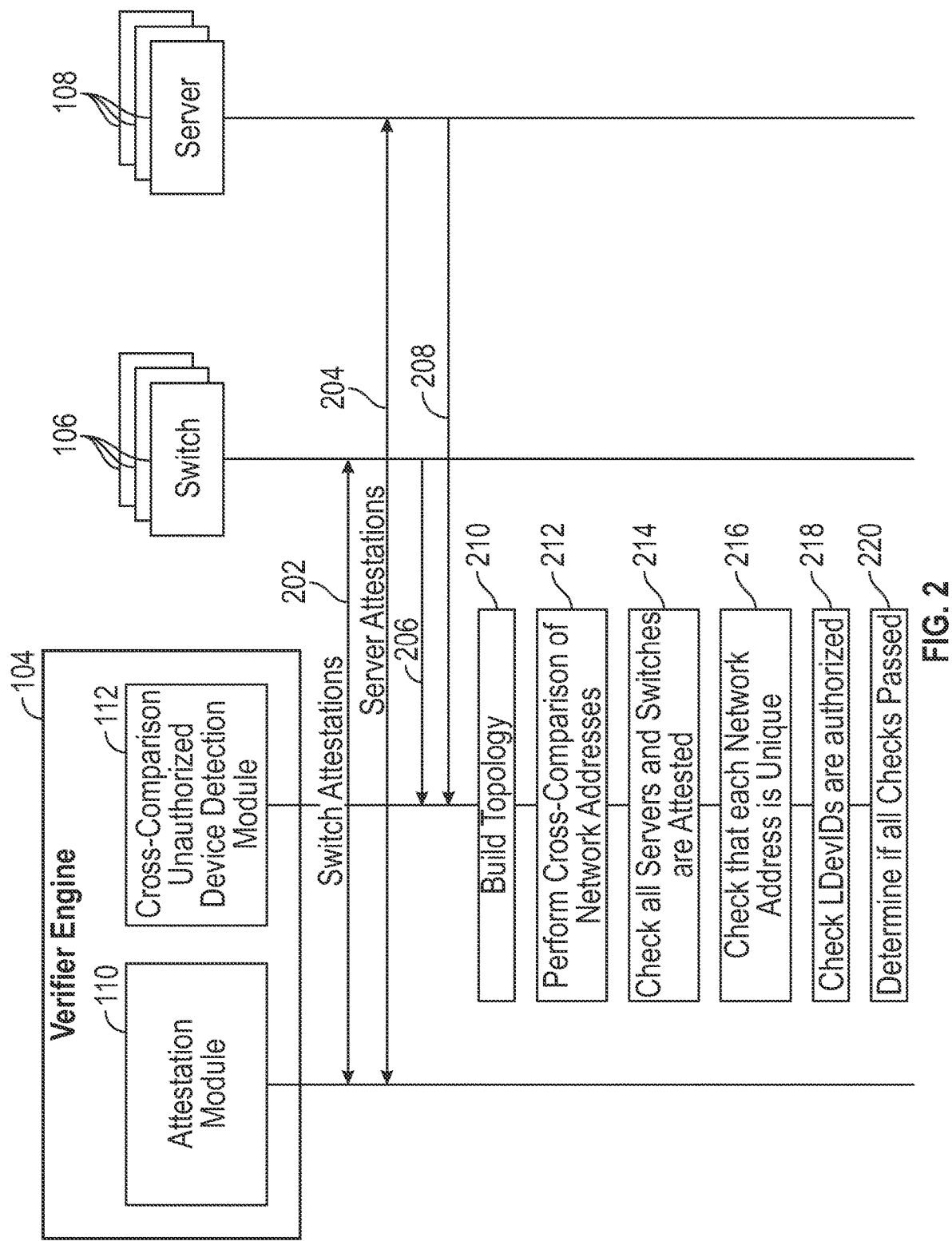
FIG. 2 is a flow diagram of an unauthorized device detection process including tasks performed by various entities according to some examples.

FIG. 2 is a message flow diagram of a process performed by the verifier engine 104, according to some examples of the present disclosure. Although FIG. 2 shows a specific sequence of tasks, it is noted that the tasks can be performed in an order different from the order of tasks shown, some of the tasks may be omitted, and/or additional tasks may be added.

The attestation module performs switch attestations (at 202) of the switches 121 to 124 of the computing environment 102, which can include attestations of device states of the ports of the switches 121 to 124 as discussed above. The attestation module performs server attestations (at 204) of the servers 131 to 137 of the computing environment 102, which can include attestations of device states of the interfaces of the servers 131 to 137 as discussed above. As part of the switch attestations and the server attestations, the attestation module 110 stores information (e.g., including network addresses) of the switches and servers attested into a repository of attested electronic devices 140 (FIG. 1). The attested electronic devices are the authorized switches and servers in the computing environment 102. Note that a rogue electronic device would not have information in the repository of attested electronic devices 140.

The cross-comparison unauthorized device detection module 112 can receive (at 206) certain device state information (e.g., network addresses, etc.) from each port of each switch being attested by the attestation module 110. Additionally, the cross-comparison unauthorized device detection module 112 can receive (at 208) certain device state information (e.g., network addresses, LDevIDs, etc.) from each interface of each server being attested by the attestation module 110. In some examples, the device state information received by the cross-comparison unauthorized device detection module 112 from the switches 121 to 124 and the servers 131 to 137 can be part of the switch attestations (202) and server attestations (204), respectively. In other examples, the device state information received by the cross-comparison unauthorized device detection module 112 from the switches 121 to 124 and the servers 131 to 137 can be in messages separate from the switch attestations (202) and server attestations (204). Such messages can include LLDP messages or other messages.

The switches 121 to 124 can provide (at 206) the information stored in their corresponding configuration information to the cross-comparison unauthorized device detection module 112. Such information from the corresponding configuration information stored in the switches 121 to 124 can be used by the cross-comparison unauthorized device detection module 112 to build the device topology. In further examples, configuration information relating to switches can be received from a controller, such as a Software-Defined Networking (SDN) controller in an SDN network in which configurations of switches are controlled by the SDN controller.

In some examples, the cross-comparison unauthorized device detection module 112 can build (at 210) a topology of electronic devices (the switches 121 to 124 and the servers 131 to 137) based on the network addresses of ports of the switches 121 to 124 and the interfaces of the servers 131 to 137. The topology identifies each electronic device in the computing environment 102, as well as links between the ports and interfaces of switches and servers, respectively.

Figure 3:
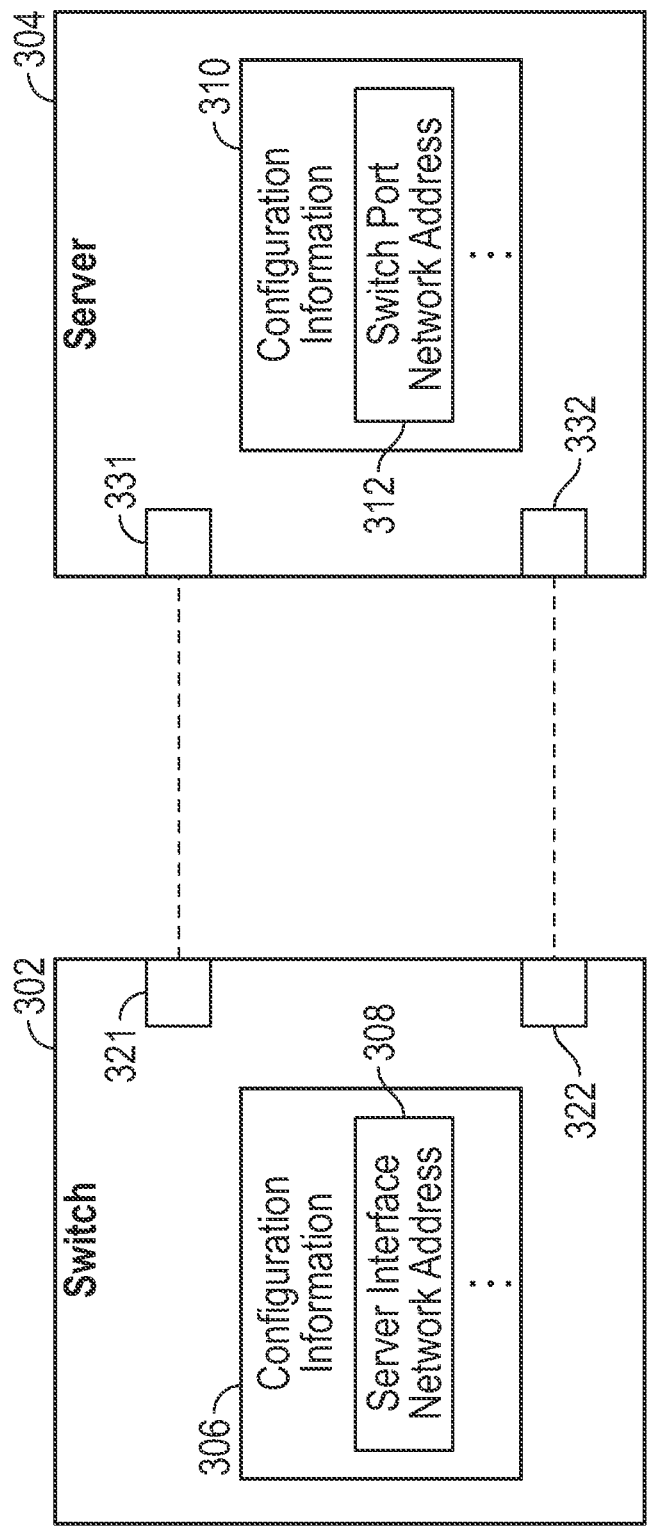
FIG. 3 is a block diagram of an arrangement including a switch and a server, according to some examples.

In some examples, each switch in the computing environment 102 includes configuration information that includes a network address (MAC address and/or IP address) of an interface of a server connected to each respective port of the switch. For example, as shown in FIG. 3, when an interface 331 of a server 304 is connected to a port 321 of a switch 302, the network address of the server interface 331 connected to the port 321 of the switch 302 is provided to the switch 302, which can store the network address (308) of the connected interface 331 of the server 304 in configuration information 306 (e.g., a configuration table) of the switch 302. The configuration information 306 can be stored in a memory of the switch 302.

The network address (308) of the server interface 331 connected to the port 321 of the switch 302 can be provided to the switch 302 by a provisioning entity (not shown) in the computing environment 102, such as a provisioning server. In other examples, the network address (308) of the server interface 331 connected to the port 321 of the switch 302 can be discovered by the switch 302 in a different way; for example, the server 304 can advertise the network address to the switch 302, or the switch 302 can query the server 304 for the network address.

As interfaces of servers are connected to ports (e.g., 321 and 322) of the switch 302, further entries are added to the configuration information 306 stored in the switch 302 indicating network addresses of interfaces of servers connected to ports of the switch 302. For example, if another interface 332 of the server 304 is connected to the port 322 of the switch 302, another entry is added to the configuration information 306 stored in the switch 302 indicating a network address of the interface 332 of the server 304 connected to the port 322 of the switch 302. Similarly, entries can be added to the configuration information 306 as interfaces of other servers are connected to further ports of the switch 302.

In some examples, ports of the switches are not assigned network addresses (e.g., MAC addresses and/or IP addresses). An example of a switch whose ports are not assigned network addresses is an unmanaged switch, which is a switch that provides hardware-based bridging of data in which a state machine in the switch bridges data received at a first port of the switch to another port of the switch.

An example of a switch whose ports are assigned network addresses is a managed switch, which has a management interface by which a management entity (not shown) in the computing environment can control an operation of the managed switch. For example, the management entity can update forwarding information in the managed switch to control forwarding of data received by the managed switch.

In examples where ports of switches are assigned network addresses, the configuration information 306 stored by the switch 302 can also contain a network address of a port of another switch connected to a port of the switch 302 (in examples where switches can be connected to one another).

FIG. 3 assumes an example in which ports of the switch 302 are assigned network addresses. In such an example, the server 304 can store configuration information 310 (e.g., a configuration table) including network addresses of switch ports connected to the interfaces (e.g., 331 and 332) of the server 304. The configuration information 310 can be stored in a memory of the server 304.

When the interface 331 of the server 304 is connected to a port of a switch (e.g., the switch port 321), a network address 312 of the switch port 321 connected to the interface 331 of the server 304 is provided to the server 304, which can store the network address 312 of the connected switch port 321 in the configuration information 310 of the server 304. The network address 312 of the switch port 321 connected to the interface 331 of the server 304 can be provided to the server 304 by a provisioning entity in the computing environment 102. In other examples, the network address 312 of the switch port 321 connected to the interface of the server 304 can be discovered by the server 304 in a different way; for example, the switch 302 can advertise the network address to the server 304, or the server 304 can query the switch 302 for the network address.

As further ports (e.g., 332) of the switch 302 or of other switches are connected to further interfaces (e.g., 332 of the server 304, further entries are added to the configuration information 310 stored in the server 304 indicating network addresses of switch ports connected to the interfaces of the server 304.

In examples where interfaces of servers are assigned network addresses and ports of switches are assigned network addresses, the configuration information maintained at each of the switches and the servers can indicate connections to one another. For example, the configuration information 306 maintained at the switch 302 can indicate that the network address of the port 321 is connected to the network address of the interface 331 of the server 304. Similarly, the configuration information 310 of the server 304 can indicate that the network address of the interface 331 is connected to the network address of the port 321 of the switch 302. In this way, the configuration information can show respective connections of switch ports to server interfaces.

As further shown in FIG. 2, based on the topology, the cross-comparison unauthorized device detection module 112 can perform cross-comparison (at 212) of network addresses of the various switches and servers being attested (as part of the attestations 202 and 204) to identify presence of any rogue electronic devices in the computing environment 102.

For example, if the device topology indicates that the interface 331 of the server 304 is connected to the port 321 of the switch 302, the cross-comparison unauthorized device detection module 112 compares a network address (either or both of a MAC address or IP address) of the interface 331 of the server 304 (sent at 208 in FIG. 2 from the server 304 to the cross-comparison unauthorized device detection module 112) to network addresses (MAC addresses and/or IP addresses) included in the configuration information 306 maintained by the switch 302 for the port 321. If the network address of the interface 331 of the server 304 sent by the server 304 to the cross-comparison unauthorized device detection module 112 matches any of the network addresses in the configuration information 306, then that indicates that the server 304 is an authorized server (i.e., not a rogue server).

As part of the cross-comparison (212), the cross-comparison unauthorized device detection module 112 further checks whether the configuration information 306 in the switch 302 contains a network address (either or both of a MAC address or IP address) of an interface of the server 304 (sent from the server 304 to the switch 302 when the server 304 connects to the switch 302) that has not been attested by the attestation module 110 (e.g., the network address of the interface of the server 304 is not in the repository of attested electronic devices 140). If the network address of the interface of the server 304 in the configuration information 306 does not match any of the network addresses in the repository of attested electronic devices 140, then that indicates that the server 304 is not an authorized server (i.e., it is a rogue server, such as 114 in FIG. 1). This condition indicates that the interface of the server 304 is not properly connected to a port of a corresponding switch that is being attested, i.e., the server 304 is a rogue server.

Similarly, if the topology indicates that the port 321 of the switch 302 is connected to the interface 331 of the server 304, the cross-comparison unauthorized device detection module 112 compares a network address (either or both of a MAC address or IP address) of the port 321 of the switch 302 (sent at 206 in FIG. 2 from the switch 302 to the cross-comparison unauthorized device detection module 112) to network addresses (MAC addresses and/or IP addresses) included in the configuration information 310 maintained by the server 304 for the interface 331. If the network address of the port 321 of the switch 302 sent by the switch 302 to the cross-comparison unauthorized device detection module 112 matches any of the network addresses in the configuration information 310, then that indicates that the switch 302 is an authorized switch (i.e., not a rogue switch).

The cross-comparison unauthorized device detection module 112 further checks whether the configuration information 310 in the server 304 contains a network address (either or both of a MAC address or IP address) of a port of the switch 302 (sent from the switch 302 to the server 304 when the switch 302 connects to the server 304) that has not been attested by the attestation module 110 (e.g., the network address of the port of the switch 302 is not in the repository of attested electronic devices 140). This condition indicates that the port of the switch 302 is not properly connected to an interface of a corresponding server that is being attested, i.e., the switch 302 is a rogue switch.

In further examples, the topology may indicate that a port of a first switch is connected to a port of a second switch (e.g., in FIG. 1, a port of the switch 121 is connected to a port of the switch 124). In such examples, the cross-comparison of network addresses performed by the cross-comparison unauthorized device detection module 112 is of a network address of a port of the first switch to network addresses stored in configuration information of the second switch.

The cross-comparison unauthorized device detection module 112 can check (at 214) that all servers and switches in the computing environment 102 are attested. For example, as the attestation module 110 attests each server and switch, the attestation module 110 can provide an indication of each successful attestation to the cross-comparison unauthorized device detection module 112, which can store the indications of successful attestations in the repository of attested electronic devices 140 stored in the verifier engine 104. The repository of attested electronic devices 140 can correlate the indications of successful attestations with corresponding identifiers (e.g., network addresses) of switches and servers. The cross-comparison unauthorized device detection module 112 can then determine if the repository of attested electronic devices 140 contains indications of successful attestations for all switches and servers that are registered in the computing environment 102. Thus, for a switch or server to be considered authorized, the switch or server has to be both registered and attested. Any switch or server that has registered in the computing environment 102 for which there is not a corresponding indication of successful attestation in the repository of attested electronic devices 140 may be identified by the cross-comparison unauthorized device detection module 112 as unauthorized, since the switch or server has not been successfully attested and thus is not in a compliant state.

The cross-comparison unauthorized device detection module 112 can check (at 216) that each network address (MAC address and/or IP address) of an interface of a server that is being attested or a port of a switch that is being attested is unique. If two server interfaces (such as an interface of a first server and an interface of a second server) share the same network address, then that may indicate network address spoofing may be being attempted by a rogue server. Thus, non-unique network addresses shared by interfaces of different servers may be an indication that at least one of the servers is a rogue server.

Similarly, if two switch ports (such as a port of a first switch and a port of a second switch) share the same network address, then that may indicate network address spoofing may be being attempted by a rogue switch. Thus, non-unique network addresses shared by ports of different switches may be an indication that at least one of the switches is a rogue switch.

The cross-comparison unauthorized device detection module 112 can check (at 218) that all reported LDevIDs from servers that are being attested (received as part of the information sent at 208) are authorized LDevIDs. For example, the check can be to determine that an LDevID is signed by an expected certificate authority, has not expired, and has not been revoked.

The cross-comparison unauthorized device detection module 112 can determine (at 220) if all of the foregoing checks (212, 214, 216, and 218) passed. If so, the cross-comparison unauthorized device detection module 112 can indicate that no rogue electronic device is present. If any of the checks did not pass, then the cross-comparison unauthorized device detection module 112 can provide an indication that a rogue electronic device is present, and may provide an indication of which switch and/or server may be the rogue electronic device. For example, if a port of a given switch and an interface of a given server are associated with network addresses that do not match (as determined at 212), then the cross-comparison unauthorized device detection module 112 can identify the given switch or the given server as potentially being unauthorized. As another example, if the cross-comparison unauthorized device detection module 112 determines (at 214) that a switch or server has not been successfully attested, then the cross-comparison unauthorized device detection module 112 can indicate that such switch or server may be unauthorized. As a further example, if the cross-comparison unauthorized device detection module 112 determines (at 216) that a non-unique network address is used by two different electronic devices, then the cross-comparison unauthorized device detection module 112 can indicate that at least one of these two electronic devices may be unauthorized. As another example, if the cross-comparison unauthorized device detection module 112 determines (at 218) that an LDevID of a given server is not authorized, then the cross-comparison unauthorized device detection module 112 can indicate that the given server may be unauthorized.

Although the foregoing examples refer to use of both MAC addresses and IP addresses, in some examples, checks based on IP addresses may not be used by the cross-comparison unauthorized device detection module 112. For example, the computing environment may be a dynamic environment where electronic devices change locations or attachment points often, which may result in IP addresses changing often. In such examples, the cross-comparison unauthorized device detection module 112 can perform its checks based on MAC addresses and not on IP addresses of interfaces of electronic devices.

Figure 4:
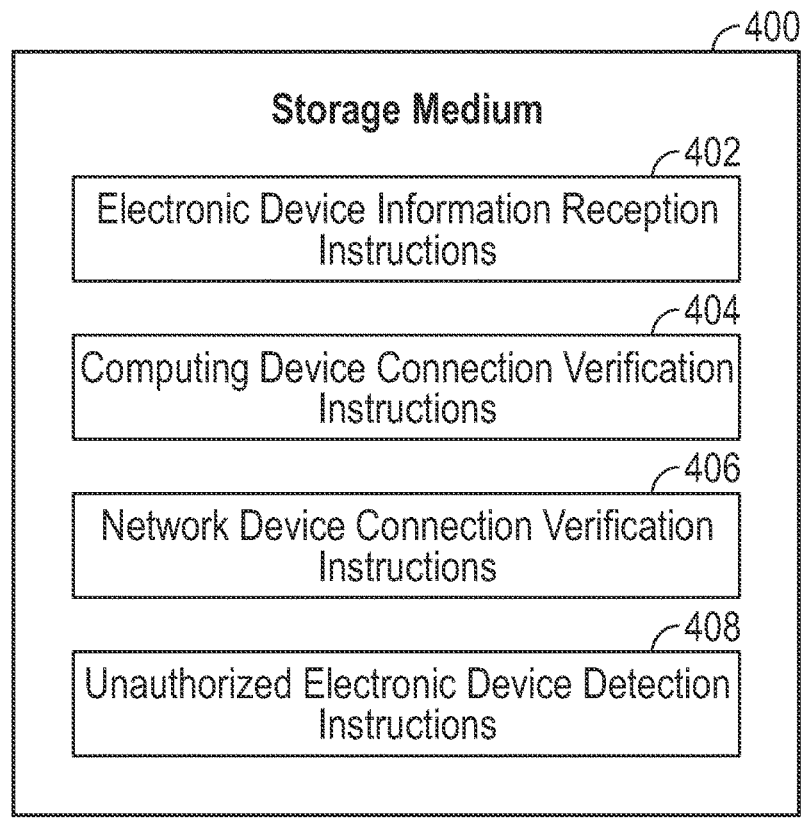
FIG. 4 is a block diagram of a storage medium storing machine-readable instructions according to some examples.

FIG. 4 is a block diagram of a non-transitory machine-readable or computer-readable storage medium 400 storing machine-readable instructions that upon execution cause a system to perform various tasks. The system can be a computer or multiple computers.

The machine-readable instructions include electronic device information reception instructions 402 to receive information from electronic devices including network devices (e.g., switches) and computing devices (e.g., servers) in a computing environment that are subject to attestations of interfaces of the network devices and the computing devices. The received information can include network addresses and other information relating to device states (or configurations) of the interfaces of the network devices and the computing devices.

The machine-readable instructions include computing device connection verification instructions 404 to, for each interface of a given computing device being attested, verify that the interface of the given computing device is connected to an interface of a corresponding network device that is being attested.

The machine-readable instructions include network device connection verification instructions 406 to, for each interface of a given network device being attested, verify that the interface of the given network device is connected to an interface of a corresponding computing device that is being attested or an interface of another network device that is being attested.

The verification performed by the computing device connection verification instructions 404 and the network device connection verification instructions 406 can include the cross-comparison of network addresses performed at 212 in FIG. 2, for example.

The machine-readable instructions include unauthorized electronic device detection instructions 408 to detect a presence of an unauthorized electronic device in the computing environment in response to determining that an interface of a computing device being attested or an interface of a network device being attested is not connected to a corresponding interface of an electronic device being attested.

In some examples, an attestation of an interface of a network device comprises verifying a configuration of a port of the network device, and an attestation of an interface of a computing device comprises verifying a configuration of a network interface controller of the computing device.

Figure 5:
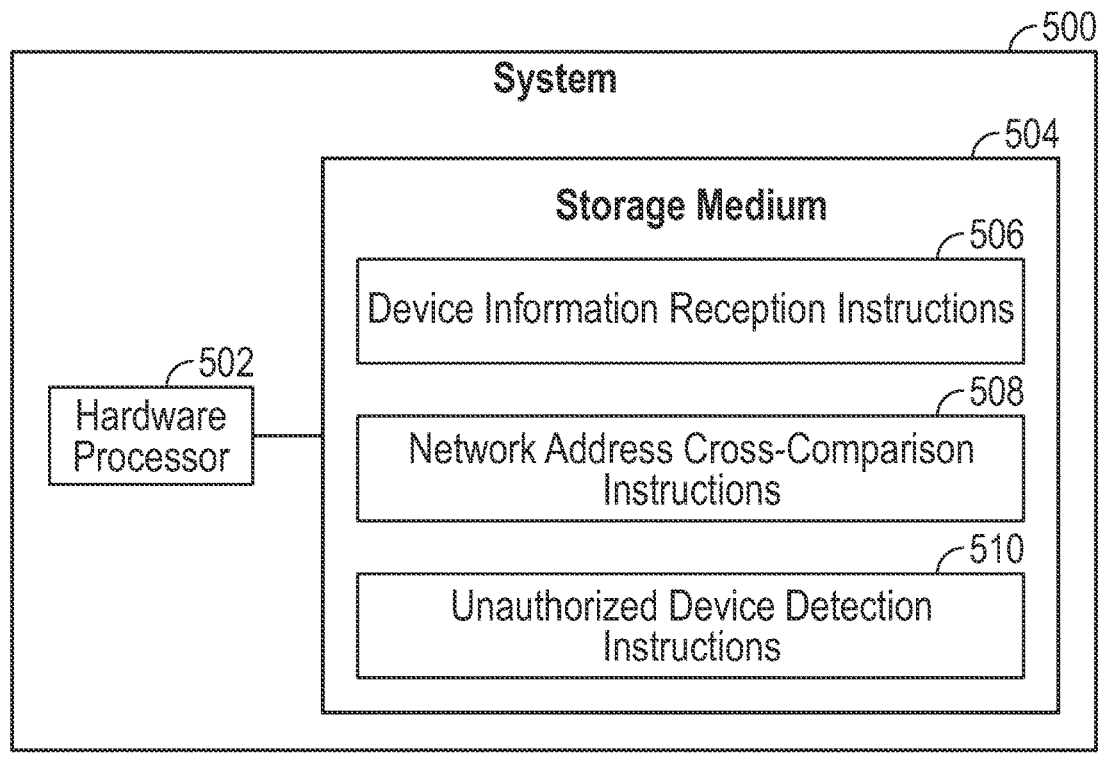
FIG. 5 is a block diagram of a system according to some examples.

FIG. 5 is a block diagram of a system 500 according to some examples. The system 500 includes a hardware processor 502 (or multiple hardware processors). A hardware processor can include a microprocessor, a core of a multi-core microprocessor, a microcontroller, a programmable integrated circuit, a programmable gate array, or another hardware processing circuit.

The system 500 includes a storage medium 504 storing machine-readable instructions executable on the hardware processor 502 to perform various tasks. Machine-readable instructions executable on a hardware processor can refer to the instructions executable on a single hardware processor or the instructions executable on multiple hardware processors.

The machine-readable instructions in the storage medium 504 include device information reception instructions 506 to receive information from network devices and computing devices in a computing environment. Each network device is to forward data units received at the network device along a network path based on identifiers (e.g., network addresses or path identifiers such as labels) in the data units.

The machine-readable instructions in the storage medium 504 include network address cross-comparison instructions 508 to, for each interface of a given network device, determine whether a network address of an interface of a connected computing device or an interface of a connected network device contained in configuration information (e.g., 306 in FIG. 3) stored in the given network device has not been attested. The attestation of network devices and computing devices can be performed by the attestation module 110, such as in tasks 202 and 204 in FIG. 2.

The machine-readable instructions in the storage medium 504 include unauthorized device detection instructions 510 to detect that the connected computing device or the connected network device is an unauthorized device in response to the network address of the interface of the connected computing device or an interface of the connected network device contained in the configuration information not having been attested.

In some examples, the machine-readable instructions can build a topology of the network devices and the computing devices based on the received information (e.g., task 210 in FIG. 2). Using the topology, the machine-readable instructions can confirm that the network address of the interface of the computing device corresponds to a network address stored at a corresponding network device. For example, the machine-readable instructions can identify which computing device interface is connected to which network device interface based on the topology. Given the identified connection, the machine-readable instructions can perform a cross-comparison of network addresses of the connected interfaces of the computing device and the network device.

Figure 6:
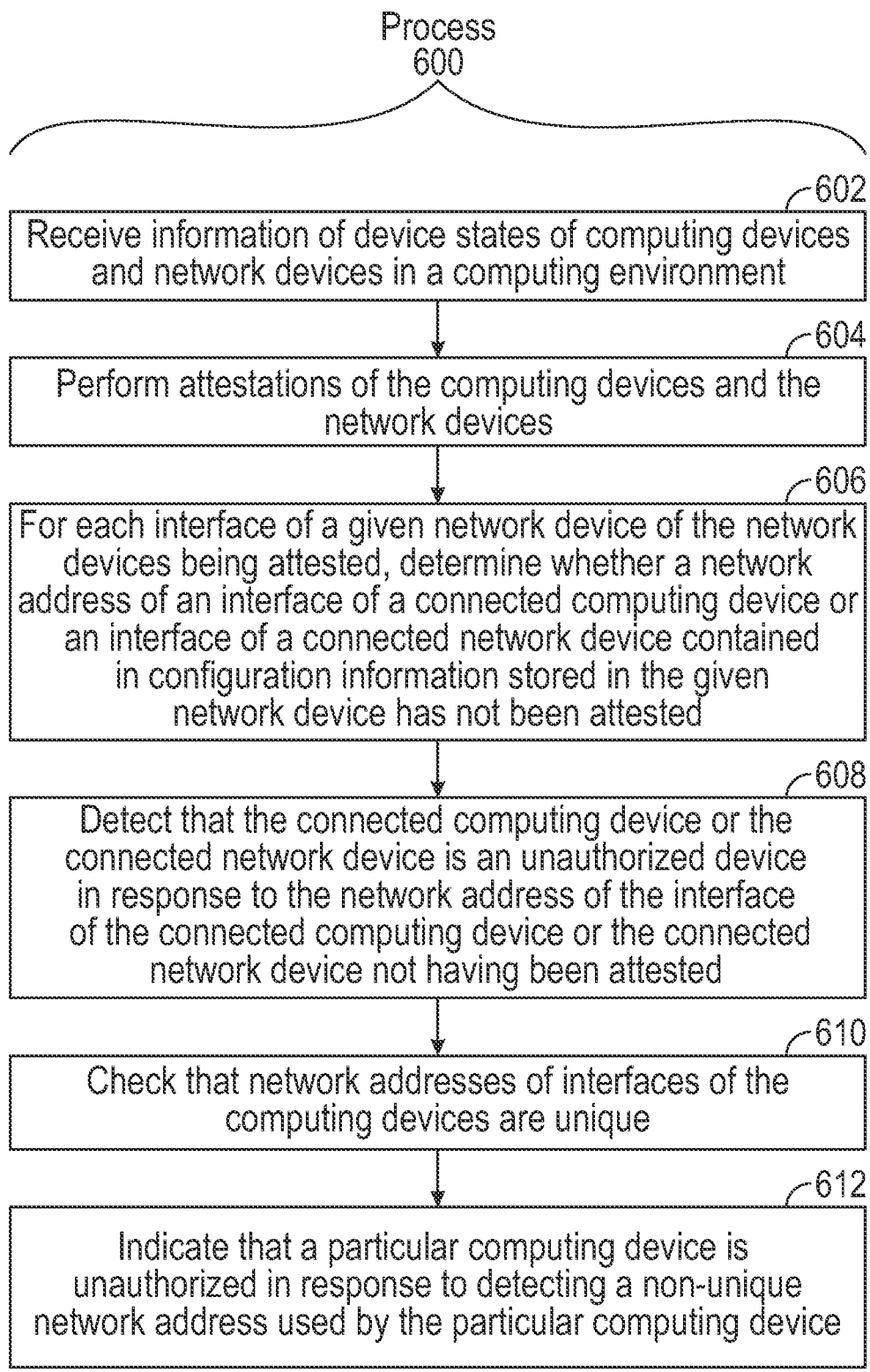
FIG. 6 is a flow diagram of a process according to some examples.

FIG. 6 is a flow diagram of a process 600 according to some examples. The process 600 can be performed by the verifier engine 104 of FIG. 1, for example.

The process 600 includes receiving (at 602) information of device states of computing devices and network devices in a computing environment. Each network device is to forward data units received at the network device along a network path based on network addresses in the data units. The information of device states can include identifiers of interfaces of the computing devices, as well as any other information discussed further above.

The process 600 includes performing (at 604) attestations of the computing devices and the network devices. Attestations can include the verifier engine 104 sending challenges to the computing devices and the network devices, and receiving measurements from the computing devices and the network devices to be verified by the verifier engine 104.

The process 600 includes, for each interface of a given network device of the network devices being attested, determining (at 606) whether a network address of an interface of a connected computing device or an interface of a connected network device contained in configuration information stored in the given network device has not been attested. The network address can include a MAC address and/or an IP address of an interface of the connected computing device or the connected network device.

The process 600 includes detecting (at 608) that the connected computing device or the connected network device is an unauthorized device in response to the network address of the interface of the connected computing device or the connected network device not having been attested. This condition can indicate that the connected computing device or the connected network device was added into the computing environment at a later time by a malicious actor.

The process 600 includes checking (at 610) that network addresses of interfaces of the computing devices are unique. If interfaces of two computing devices share the same network address, then the network addresses of the interfaces of the two computing devices are not unique, which may indicate network address spoofing may be being attempted by a rogue computing device. The process 600 includes indicating (at 612) that a particular computing device is unauthorized in response to detecting a non-unique network address used by the particular computing device. In examples where network devices are assigned network addresses, the process 600 can also check that interfaces of network devices are unique, and indicate that a particular network device is unauthorized in response to detecting a non-unique network address used by the particular network device.

A "BMC" can refer to a specialized service controller that monitors the physical state of an electronic system using sensors and communicates with a remote management system (that is remote from the electronic system) through an independent "out-of-band" connection. The BMC can perform management tasks to manage components of the electronic system. Examples of management tasks that can be performed by the BMC can include any or some combination of the following: power control to perform power management of the electronic system (such as to transition the electronic system between different power consumption states in response to detected events), thermal monitoring and control of the electronic system (such as to monitor temperatures of the electronic system and to control thermal management states of the electronic system), fan control of fans in the electronic system, system health monitoring based on monitoring measurement data from various sensors of the electronic system, remote access of the electronic system (to access the electronic system over a network, for example), remote reboot of the electronic system (to trigger the electronic system to reboot using a remote command), system setup and deployment of the electronic system, system security to implement security procedures in the electronic system, and so forth.

In some examples, the BMC can provide so-called "lights-out" functionality for an electronic system. The lights out functionality may allow a user, such as a systems administrator, to perform management operations on the electronic system even if an operating system (OS) is not installed or not functional on the electronic system.

Moreover, in some examples, the BMC can run on auxiliary power provided by an auxiliary power supply (e.g., a battery); as a result, the electronic system does not have to be powered on to allow the BMC to perform the BMC's operations. The auxiliary power supply is separate from a main power supply that supplies powers to other components (e.g., a main processor, a memory, an input/output (I/O) device, etc.) of the electronic system.

A storage medium (e.g., 400 in FIG. 4 or 504 in FIG. 5) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a system to:

receive, at the system, information relating to electronic devices comprising network devices and computing devices in a computing environment that are subject to attestations of interfaces of the network devices and the computing devices, wherein the system is separate from the network devices and the computing devices;

receive, at the system, configuration information stored at a first network device that is being attested, the configuration information stored at the first network device including entries containing network address information of respective computing devices, the entries added to the configuration information as the respective computing devices are connected to interfaces of the first network device;

for each interface of a given computing device being attested, perform a cross comparison of information of the given computing device being attested and information of the first network device being attested, the cross comparison comprising verifying, by the system, that the interface of the given computing device is connected to an interface of the first network device based on confirming that network address information of the interface of the given computing device matches network address information in the configuration information stored at the first network device and received at the system;

for each interface of a given network device being attested, verify that the interface of the given network device is connected to an interface of a corresponding computing device that is being attested or an interface of another network device that is being attested; and detect a presence of an unauthorized electronic device in the computing environment in response to determining that an interface of a computing device being attested or an interface of a network device being attested is not connected to a corresponding interface of an electronic device being attested.

2. The non-transitory machine-readable storage medium of claim 1, wherein the received information relating to the electronic devices comprises network addresses of the interfaces of the network devices and the computing devices.

3. The non-transitory machine-readable storage medium of claim 1, wherein an attestation of an interface of a network device comprises verifying a configuration of a port of the network device.

4. The non-transitory machine-readable storage medium of claim 1, wherein an attestation of an interface of a computing device comprises verifying a configuration of a network interface controller of the computing device.

5. The non-transitory machine-readable storage medium of claim 1, wherein the instructions upon execution cause the system to:
build topology information identifying links between computing devices and the interfaces of the first network device based on the configuration information stored at the first network device.

6. The non-transitory machine-readable storage medium of claim 5, wherein the instructions upon execution cause the system to:
determine, based on the topology information, that the given computing device is connected to the first network device.

7. The non-transitory machine-readable storage medium of claim 1, wherein the network address information of the interface of the given computing device comprises a computing device Medium Access Control (MAC) address, or a computing device Internet Protocol (IP) address, or a pair of the computing device MAC address and the computing device IP address.

8. The non-transitory machine-readable storage medium of claim 1, wherein the instructions upon execution cause the system to:
indicate the presence of the unauthorized electronic device in response to detecting that network address information of an interface of a first electronic device is not unique, wherein the first electronic device is a computing device or a network device.

9. The non-transitory machine-readable storage medium of claim 1, wherein the instructions upon execution cause the system to:
detect presence of an unauthorized electronic device in the computing environment based on detecting that configuration information in a network device or a computing device contains a network address for an electronic device that has not been attested.

10. The non-transitory machine-readable storage medium of claim 1, wherein the instructions upon execution cause the system to:
detect presence of an unauthorized electronic device in the computing environment based on determining that network addresses in configuration information in a network device or a computing device do not match any network address in a repository of attested electronic devices.

11. The non-transitory machine-readable storage medium of claim 1, wherein the instructions upon execution cause the system to:
verify that an identifier of a computing device is an authorized identifier; and
indicate the presence of the unauthorized electronic device if the identifier of the computing device is not an authorized identifier.

12. A system comprising:
a hardware processor; and
a non-transitory storage medium storing instructions executable on the hardware processor to:
receive information from network devices and computing devices in a computing environment, wherein each network device of the network devices is to forward data units received at the network device along a network path based on identifiers in the data units, and wherein the system is separate from the network devices and the computing devices;
receive configuration information stored at a first network device that is being attested, the configuration information stored at the first network device including entries containing network address information of respective computing devices, the entries added to the configuration information as the respective computing devices are connected to interfaces of the first network device;
for each interface of a given computing device being attested, perform a cross comparison of information of the given computing device being attested and information of the first network device being attested, the cross comparison comprising verifying that the interface of the given computing device is connected to an interface of the first network device based on confirming that network address information of the interface of the given computing device matches network address information in the configuration information stored at the first network device and received at the system; and
detect that the given computing device is an unauthorized device in response to the network address information of the interface of the given computing device not matching the network address information in the configuration information stored at the first network device.

13. The system of claim 12, wherein the instructions are executable on the hardware processor to:
build a topology of the network devices and the computing devices based on the received information; and
using the topology, confirm that the given computing device is connected to the first network device.

14. The system of claim 12, wherein the instructions are executable on the hardware processor to:
check that each of the network devices and the computing devices has been successfully attested; and
indicate that any network device or computing device is unauthorized if the network device or computing device has not been successfully attested.

15. The system of claim 12, wherein the instructions are executable on the hardware processor to:
for an interface of a first computing device, determine whether a network address of an interface of a second network device contained in configuration information stored at the first computing device has not been attested; and
detect that the second network device is an unauthorized network device in response to the network address of the interface of the second network device contained in the configuration information stored at the first computing device not having been attested.

16. The system of claim 12, wherein the instructions are executable on the hardware processor to:
check that network addresses of interfaces of the computing devices are unique; and
indicate that a particular computing device is unauthorized in response to detecting a non-unique network address used by the particular computing device.

17. The system of claim 12, wherein the instructions are executable on the hardware processor to:
check that network addresses of interfaces of the network devices are unique; and
indicate that a particular network device is unauthorized in response to detecting a non-unique network address used by the particular network device.

18. A method comprising:
receiving, by a system comprising a hardware processor, information of device states of computing devices and network devices in a computing environment, wherein each network device of the network devices is to forward data units received at the network device along a network path based on identifiers in the data units, and wherein the system is separate from the network devices and the computing devices;
performing, by the system, attestations of the computing devices and the network devices;
receiving, by the system, configuration information stored at a first network device that is being attested, the configuration information stored at the first network device including entries containing network addresses of respective computing devices, the entries added to the configuration information as the respective computing devices are connected to interfaces of the first network device;
for each interface of a given computing device being attested, performing a cross comparison of information of the given computing device being attested and information of the first network device being attested, the cross comparison comprising verifying that the interface of the given computing device is connected to an interface of the first network device based on confirming that a network address of the interface of the given computing device matches a network address in the configuration information stored at the first network device and received at the system;
detecting, by the system, that the given computing device is an unauthorized device based on determining that the network address of the interface of the given computing device does not match the network addresses in the configuration information stored at the first network device;
check that network addresses of interfaces of the computing devices are unique; and
indicate that a particular computing device is unauthorized in response to detecting a non-unique network address used by the particular computing device.

19. The method of claim 18, wherein the network address of the interface of the given computing device comprises a Medium Access Control (MAC) address or an Internet Protocol (IP) address.

20. The method of claim 18, comprising:
determining that the network address of the interface of the given computing device has not been attested based on detecting that the network address of the interface of the given computing device is not in a repository of attested electronic devices.

* * * * *